United States Patent
Pehle et al.

(10) Patent No.: US 12,313,133 B2
(45) Date of Patent: May 27, 2025

(54) DISK BRAKE AND SHELL ASSEMBLY FOR PRESSURE TRANSMISSION IN A BRAKE APPLICATION DEVICE OF A DISK BRAKE

(71) Applicant: BPW Bergische Achsen Kommanditgesellschaft, Wiehl (DE)

(72) Inventors: Michael Pehle, Wiehl (DE); Thomas Klaas, Reichshof (DE); Andreas Steffen, Lohmar (DE)

(73) Assignee: BPW Bergische Achesen Kommanditgesellschaft, Wiehl (DE)

( * ) Notice: Subject to any disclaimer, the term of this patent is extended or adjusted under 35 U.S.C. 154(b) by 365 days.

(21) Appl. No.: 17/915,618

(22) PCT Filed: Mar. 8, 2021

(86) PCT No.: PCT/DE2021/100230
§ 371 (c)(1),
(2) Date: Sep. 29, 2022

(87) PCT Pub. No.: WO2021/197536
PCT Pub. Date: Oct. 7, 2021

(65) Prior Publication Data
US 2023/0143111 A1    May 11, 2023

(30) Foreign Application Priority Data
Mar. 31, 2020  (DE) ..................... 10 2020 108 865.5

(51) Int. Cl.
*F16D 55/2255*  (2006.01)
*F16D 55/00*  (2006.01)
*F16D 125/28*  (2012.01)

(52) U.S. Cl.
CPC .. *F16D 55/2255* (2013.01); *F16D 2055/0016* (2013.01); *F16D 2125/28* (2013.01)

(58) Field of Classification Search
CPC ......... F16D 55/2255; F16D 2055/0016; F16D 2125/28
(Continued)

(56) References Cited

U.S. PATENT DOCUMENTS

| 5,515,949 A | * | 5/1996 | Baumgartner | .......... F16D 65/18 |
| | | | | 384/908 |
| RE37,231 E | * | 6/2001 | Severinsson | ............ F16D 65/18 |
| | | | | 188/71.9 |

(Continued)

FOREIGN PATENT DOCUMENTS

| CN | 1388874 A | 1/2003 |
| DE | 29510331 U1 | 10/1996 |

(Continued)

OTHER PUBLICATIONS

Translated Chinese First Office Action, App. No. 202180025284.8, dated May 1, 2024, pp. 1-14.

(Continued)

*Primary Examiner* — Christopher P Schwartz
(74) *Attorney, Agent, or Firm* — BOND, SCHOENECK & KING, PLLC; George R. McGuire

(57) ABSTRACT

Disk brake including a brake caliper and an application device arranged therein for applying force to the brake pads of the disk brake, wherein a component of the application device is a brake lever which can be actuated by a force element and preferably by a pressure cylinder and is composed of a lever arm against which the force element is supported and an application shaft. The application shaft is supported, on one side, against a pressure piece operating in the direction of the brake pads and, on the other side, with the interposition of a shell, against a channel arranged on the inside of the brake caliper, wherein the curvature of the shell is complementary to the curvature of the channel. In order to develop the disk brake and the shell assembly by con- (Continued)

structive measures so as to prevent the shell assembly from moving out of the original position even in the case of long-term use and under frequent load caused by braking, an opening of a bore is located in the channel.

13 Claims, 2 Drawing Sheets

(58) Field of Classification Search
USPC .............................................. 188/72.7–72.9
See application file for complete search history.

(56) References Cited

U.S. PATENT DOCUMENTS

| | | | |
|---|---|---|---|
| 7,134,532 B2* | 11/2006 | Baumgartner | F16D 65/18 |
| | | | 188/71.7 |
| 7,506,732 B2* | 3/2009 | Antony | F16D 65/183 |
| | | | 188/72.9 |
| 11,624,414 B2* | 4/2023 | Klaas | B60T 1/065 |
| | | | 188/72.9 |
| 2007/0023239 A1 | 2/2007 | Linke | |

FOREIGN PATENT DOCUMENTS

| | | |
|---|---|---|
| DE | 10213520 A1 | 10/2002 |
| DE | 102012006113 A1 | 9/2013 |
| DE | 102014115762 A1 | 5/2016 |
| EP | 1311772 A2 | 5/2003 |
| EP | 3499071 A1 | 6/2019 |
| WO | 2013143979 A1 | 10/2013 |
| WO | 2014041156 A1 | 3/2014 |
| WO | 2019015716 A1 | 1/2019 |
| WO | 2019115037 A1 | 6/2019 |

OTHER PUBLICATIONS

International Search Report and Written Opinion for PCT/DE2021/10030, filed Mar. 8, 2021. pp. 1-8.
Search Report for Priority Application DE 10 2020 108 865.5, filed Mar. 31, 2020. pp. 1-5.

* cited by examiner

DISK BRAKE AND SHELL ASSEMBLY FOR PRESSURE TRANSMISSION IN A BRAKE APPLICATION DEVICE OF A DISK BRAKE

CROSS-REFERENCE TO RELATED APPLICATION(S)

This application is the United States National Phase application filed under 35U.S.C. 371 of International Application No. PCT/DE2021/100230, filed Mar. 8, 2021, which claims priority to German Patent Application No. 10 2020 108 865.5 filed with the German Patent Office on Mar. 31, 2020, the entirety of each of which is hereby incorporated by reference.

BACKGROUND

The invention relates to a disk brake having a brake caliper and an application device arranged therein.

The invention further relates to a shell assembly for pressure transmission in an application device of a disk brake.

Disk brakes are generally provided with an application device within their brake caliper. The application device transmits and amplifies the force with which the brake pads arranged on either side of the brake disk are then brought into contact with the brake disk to thus achieve the braking effect by friction.

In generic disk brakes, which are often pneumatic, a brake lever pivotably arranged in the brake caliper is part of the application device. The brake lever consists of a force-amplifying lever arm and an application shaft, which is designed in cross section like an eccentric. The force element of the disk brake, e.g., the pneumatic cylinder in the case of a pneumatic disk brake, is supported against the lever arm. The application shaft of the brake lever is supported, on one side, against a pressure piece operating towards the brake pad inside the vehicle and, on the other side, against the rear side of the brake caliper housing.

WO 2019/015716 A1, DE 10 2012 006 113 A1 and DE 295 10 331 U1 disclose disk brakes having the aforementioned features and in which the inner wall of the brake caliper is designed as a partially cylindrical channel to support the brake lever on the rear side, i.e., on the brake caliper side, and the application shaft of the brake lever is designed as a partially cylindrical section. In some of the prior art, the application shaft facing the channel on the brake caliper also comprises a channel, wherein a support roller having a roller axis extending transversely to the direction of application is mounted between the channels. A shell is additionally arranged between the support roller and the channel on the brake caliper side, which shell, as a sliding shell, prevents excessive material removal at the channel. Due to the recurring high compressive forces during braking, there is a risk of the shell moving out of the channel on the brake caliper side in the circumferential direction. To counteract this, the shell assembly of WO 2019/015716 A1 has two tabs for positive locking at the channel. The tabs are configured to be supported in complementary recesses in the brake caliper, which adjoin the channel.

However, it has been found that the tabs were deformed under constant load and that the shell assemblies started to move out of the channels due to the decreasing locking action.

SUMMARY OF THE INVENTION

The object of the invention is to further develop the disk brake and the shell assembly by constructive measures in order to prevent the shell assembly from moving out of the original position even in the case of long-term use and the frequent load caused by braking.

The object is proposed to be achieved by a disk brake and by a shell assembly for pressure transmission in an application device of a disk brake.

The disk brake is characterized in that the opening of a bore is located in the channel, in that a passage is formed on the shell, facing the channel, which passage is produced by deformation of the shell material and extends in the form of a collar into the bore and establishes a positive fit between the shell and the channel, and in that a shaped element is arranged in the passage, the outer diameter of which is equal to the inner diameter of the passage.

The shell assembly comprises, among other things, a shell on which a passage produced by deformation of the shell material is formed on the side of the convex pressure transmission surface and has the shape of a collar. A further component of the shell assembly is a shaped element arranged in the passage, the outer diameter of which shaped element is equal or nearly equal to the inner diameter of the passage.

The disk brake allows for an even long-term improved locking of the shell arranged between the brake lever or the support roller and the channel to prevent it from leaving the original shell position. Due to the passage collar that is complementary to the bore, a locking of the shell in the channel is achieved. In order to reinforce the collar and prevent re-deformation and a resulting slackness of the shell as a result of constant load, a shaped element is pressed into the passage once the shell has been inserted into the channel and the collar has been locked inside the bore. The shaped element slightly expands the collar to fix the device in the bore, wherein the shaped element additionally supports the collar with respect to shear forces. Consequently, both the structural integrity of the shell and its permanent seat at the original shell position relative to the channel are improved.

The shell of the shell assembly is a rectangular surface element in the form of a longitudinal channel, which hence has a channel-shaped cross section with a partially circular bend. An opening in the form of a passage is formed at the lowest point of the bend and channel and in the geographical center point of the shell. From a manufacturing point of view, the passage is a punching of the shell towards its convex side, wherein a collar extending orthogonally to and circumferentially around the convex pressure transmission surface is formed along the edges of the opening in the form of the deformed material.

The bore opening at the bottom of the channel is preferably designed as a blind bore. Therefore, the bore does not penetrate the material of the channel or of the brake caliper completely, but only up to a certain depth.

The length of the bore preferably has a greater depth than the sum of the passage and of the shaped element protruding from the passage, wherein the bore has a depth equal to or greater than 1.2 times the axial extension of the shaped element. A depth of the bore that is dependent on the shaped element results from the fact that the shaped element is held in the region of the passage, more precisely at the level of the collar. In particular, the shaped element must not rest prematurely on the base of the bore during assembly in order not to be pressed in the direction of the application shaft.

At the same time, the depth of the bore must be selected such that the shaped element, before it can slide out of the passage as a result of loads for example in the form of vibrations acting in the direction of the bore, is prevented from doing so by selecting the bore depth accordingly.

Therefore, the shaped element must be held at the level of the collar or must continuously rest with its outer surface against the inner surface of the passage.

Furthermore, there is a circumferential bevel on the bore opening in order to avoid a shear edge which in the long run could adversely affect the collar of the passage during operation.

With its end face facing away from the bore, the shaped element does not protrude beyond the plane of curvature of the concave pressure transmission surface. Therefore, the shaped element must not exceed the level of the concave pressure transmission surface of the shell, as it would otherwise contact the application shaft and could damage the surface of the application shaft as a result of the latter's movement during braking. Furthermore, contact between the shaped element and the application shaft could cause stiffness of the brake lever.

The application shaft is preferably designed to receive a support roller between itself and the shell. The support roller is rotatably or positively mounted on the application shaft on a partial circumference and is rotatably mounted on the shell on another partial circumference. The use of a support roller has the advantage that the brake lever has to be formed with a partial roller section, which is difficult to manufacture, only towards the pressure piece, wherein a partially cylindrical recess in the brake lever receives the support roller in a preferably rotationally fixed manner towards the brake caliper. Despite the addition of the support roller as a further component, the production effort is reduced by the partially cylindrical recess compared to a second partial roller section.

The shell of the shell assembly preferably has a friction-reducing surface coating on its concave pressure transmission surface. On its convex side, the shell is locked in the channel in a form-fitting manner by the passage, wherein the application shaft or the support roller rests against the concave side of the shell by means of a plain bearing. In order to maintain smooth running and to reduce material wear between the application shaft or the support roller and the concave pressure transmission surface, the friction-reducing surface coating on the shell ensures that the components slide more gently against each other.

Preferably, the shaped element is a cylindrical pin, wherein preferably the cylindrical pin is formed from unhardened and austenitic stainless steel. The cylindrical pin is manufactured according to the tolerances and dimensions of EN ISO 2338: 1997, wherein it is also possible to select cylindrical pins from ISO 3269: 1988, ISO 3506-1: 1997, ISO 4042: and ISO 9717: 1990.

However, cylindrical pins of other standards can also be selected. Their corrosion resistance is necessary, however, in order to counteract corrosion in the event of continuous, potentially corrosive contact with the environment and to increase the longevity of the shaped element.

BRIEF DESCRIPTION OF THE DRAWINGS

Further advantageous measures are explained in more detail below along with the description of a preferred exemplary embodiment with reference to the figures. In the drawings.

DETAILED DESCRIPTION

Figure 1:
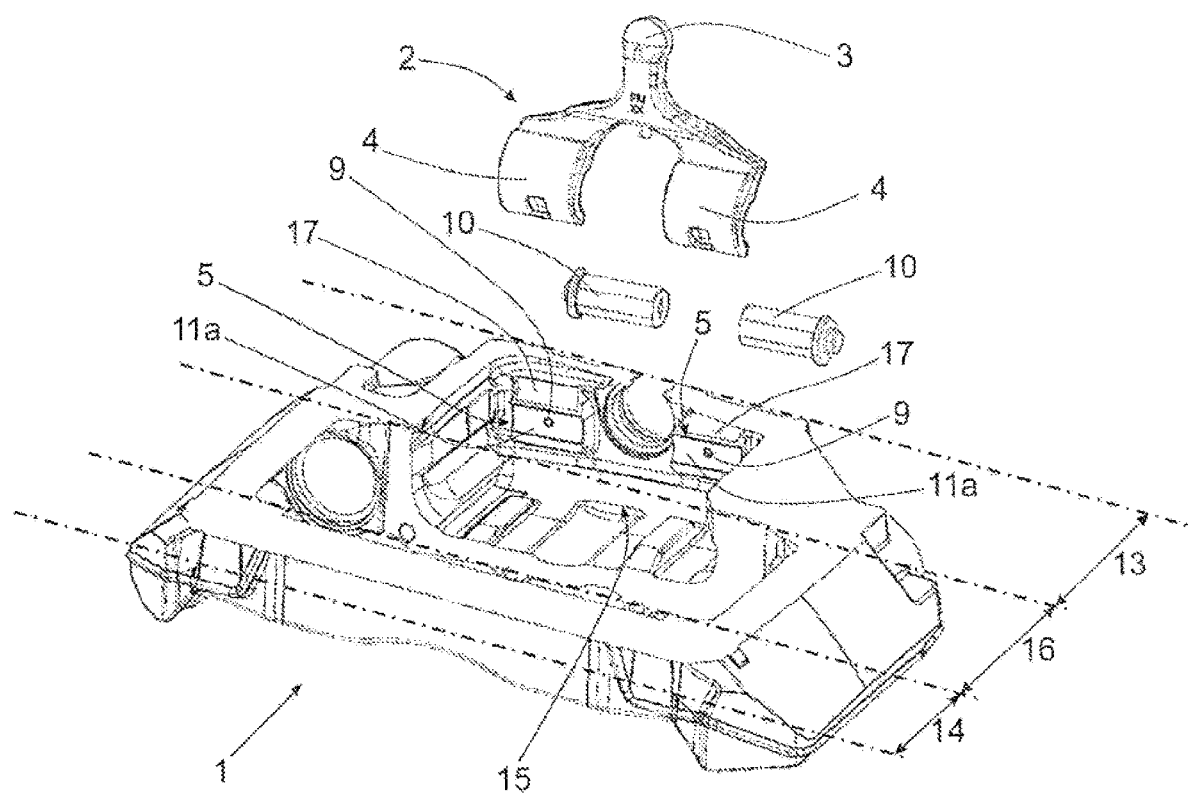
FIG. 1 shows an exploded view of a brake caliper, two support rollers and a brake lever with a shell fastened to the brake caliper.

FIG. 1 shows an exploded view of a brake caliper 1 with shells 5 inserted into two partially cylindrical channels 6 of the brake caliper and a brake lever 2 and two support rollers 10. The brake caliper 1 is designed like a sliding or floating caliper of a disk brake, in particular of a pneumatic disk brake.

The brake caliper 1 cast as one single piece is composed of three sections. A first caliper section 13, which is located inside the vehicle when the disk brake is installed, is provided with a cavity 15 in its interior, which cavity provides space for a brake application device. A second caliper section 14, which is located outside the vehicle when the brake is installed, is arranged on the opposite side of the brake disk (not shown) of the disk brake. The two caliper sections 13, 14 are connected to one another by a bridge section 16, which bridges the brake disk (not shown), thereby providing a free space for at least a part of the brake disk and for the brake pads (also not shown).

Here, the brake caliper 1 is in one piece insofar as the two caliper sections 13, 14 and the bridge section 16 are formed monolithically. The first caliper section 13 is open towards the free space of the bridge sections 16 and thus towards a brake disk. This opening serves, inter alia, as an assembly opening and is so large that the application device can be installed through it. After the brake assembly has been completed, the opening is closed by a cover.

A brake lever 2 which can be actuated by a pneumatic brake cylinder is fork-shaped overall, since it branches into two legs starting from the lever arm 3 arranged on the pivot center line. A first longitudinal section is located on the first leg, and a second longitudinal section of an application shaft 4 formed in one piece with the lever arm 3 is located on the second leg. Since the application shaft 4 is divided into two longitudinal sections, two separate channels, which are however aligned with one another, are formed on the brake lever 2, each for supporting a support roller 10 designed as a roller.

In the installed state, the application shaft 4 is supported, on one side, against the first caliper section 13 via the rollers or support rollers 10 and, on the other side, against a pressure piece operating towards the inner brake pad of the disk brake, which thus exerts force against the brake pad of the disk brake inside the vehicle.

A shell 5 which is interchangeable in case of wear is arranged as a plain bearing shell between each of the two longitudinal sections of the application shaft 4 and a channel 6 formed on the inside of the first caliper section 13 and forms a component for supporting the application shaft 4. This is because replacement of only the shells 5 is much more advantageous than replacement of the brake caliper due to wear on the channels 6.

The two channels 6 arranged at a distance from one another on the inner wall of the first saddle section 13 are each designed as a partially cylindrical recess for the purpose of mounting the shells 5. This simplifies producibility of the channels 6, especially since the channels 6 are aligned with one another in such a way that they can be machined in one work step.

According to FIG. 1, the application shaft 4 is mounted eccentrically to achieve a high application force. This is because the pivot bearing supported against the brake caliper 1 is offset in height in comparison to the pivot axis (not shown) of the pivot bearing arranged between the application shaft 4 and the pressure piece (not shown). Therefore, when the eccentrically mounted application shaft 4 is rotated, there is a forward movement onto the pressure piece in the direction of application and, in response thereto, a corresponding pressure increase on the shell 5, as a result of which the brake applies and exerts braking force.

The lever arm 3 formed integrally on the application shaft 4 serves to rotate the latter. The lever arm is provided with a support location close to its free end, against which support location pressure is applied. In the case of pneumatic disk brakes, this force-exerting device is a pneumatic brake cylinder which is supplied with compressed air by the compressed air system of the vehicle.

Figure 2:
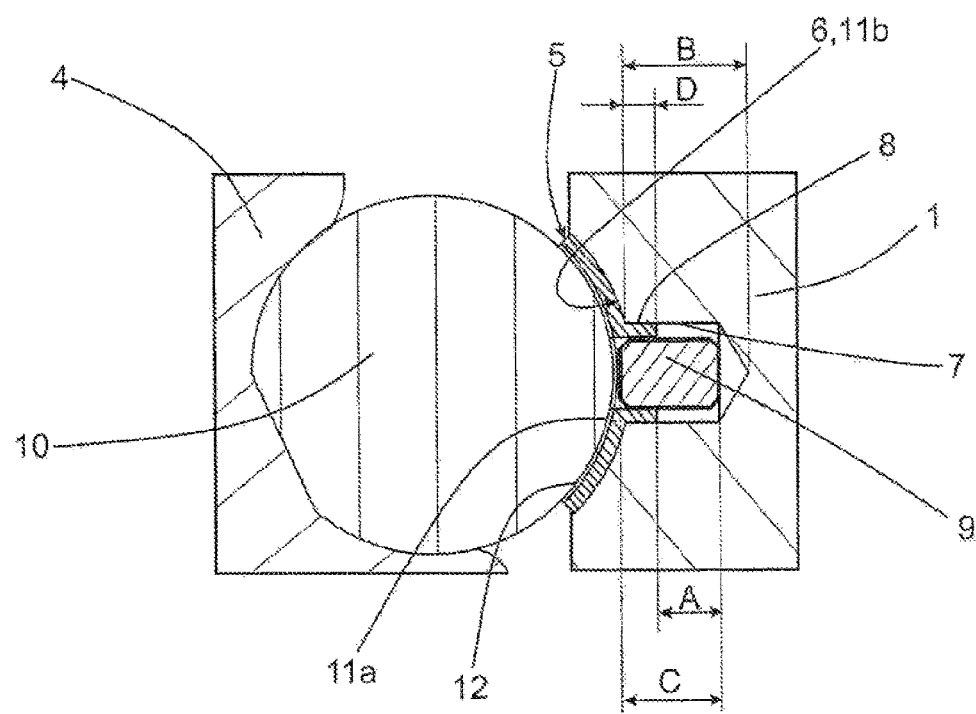
FIG. 2 shows a schematic cross section of a shell assembly which is locked by means of a shaped element and a passage relative to a channel on the brake caliper side.

FIG. 2 is a schematic cross section of the shell 5 locked in the channel 6 by means of a passage 8 and a shaped element 9. Each of the two shells 5 consists of an originally flat metal sheet produced by punching and deformation.

Figure 3:
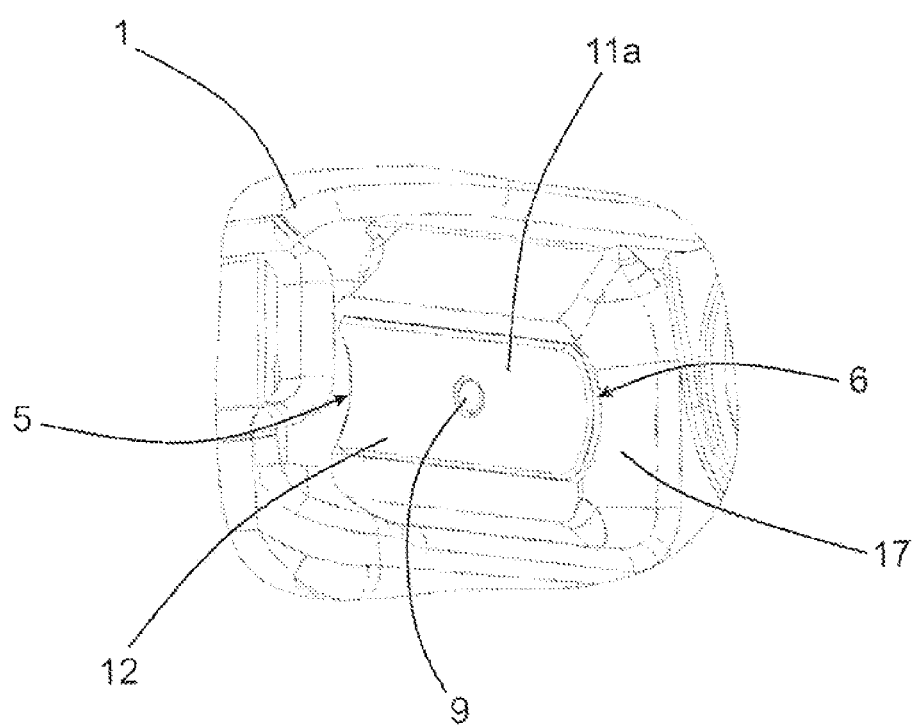
FIG. 3 shows a perspective view of the shell assembly with an integrated shaped element in a locked position on a channel on the brake caliper side.

According to FIG. 2 and FIG. 3, the shell 5 has a lateral surface, wherein the lateral surface has a partially circular cross section in the longitudinal direction of the application shaft 4. The shell 5 thus has, on one side, a concave pressure transmission surface 11a for supporting the brake lever 2 of the application device, and, on the other side, a convex pressure transmission surface 11b for supporting against the abutment formed as a channel 6 on the inside of the brake caliper.

The opening of a bore 7 in the brake caliper is located at the lowest point of the channel 6. A passage 8 produced by deformation of the shell material is formed on the shell 5, facing the channel 6. The passage 8 extends in the form of a collar into the bore 7 of the brake caliper and secures a positive fit between the shell 5 and the channel 6.

A shaped element 9, which is designed as a cylinder and the outer diameter of which is equal to the inner diameter of the passage 8, is arranged in the passage 8 in a positionally fixed manner. Preferably, the shaped element 9 is pressed in the passage 8 by means of a transition fit or a press fit. The shell 5, the passage 8 and the shaped element 9 together form a shell assembly.

The bore 7 is a blind bore perpendicular to the longitudinal axis of the channel 6. The length of the bore 7 has a greater depth than the sum of the length of the passage 8 and of the shaped element 9 protruding from the passage 8, wherein the bore 7 has a depth of, for example, 1.2 times the axial extension of the shaped element 9.

The end face of the shaped element 9 of the shell assembly facing away from the bore 7 is designed to not protrude beyond the plane of curvature of the concave pressure transmission surface 11a of the shell 5. In other words, the bore depth B must be so great that it exceeds the length C of the shaped element 9, locked in the passage 8, with its remaining length A protruding from the passage 8, in total with the height of the collar D of the passage 8. Furthermore, the bore depth B must not exceed the length C of the shaped element so far that the shaped element 9 could slide completely into the bore 7 from the passage 8 when the shaped element 9 becomes loose within the passage 8.

FIG. 3 shows a perspective view of the shell assembly comprising the shell 5 and the integrated shaped element 9, locked on the channel 6.

In order to form the channels 6, plateaus 17 are formed on the inside of the first caliper section 13, the plateaus 17 being formed monolithically with the brake caliper 1. The formation of plateaus 17 and of the channels 6 formed therein form an arrangement which is advantageous in terms of production, in order to reduce working steps and the complexity of production.

In order to increase the service life of the shell assembly, the shell 5 has a friction-reducing surface coating 12 on its concave pressure transmission surface 11a, on which the support roller 10 can rotate with less friction force compared to an uncoated surface.

LIST OF REFERENCE SIGNS

1 Brake caliper
2 Brake lever
3 Lever arm
4 Application shaft
5 Shell
6 Channel
7 Bore
8 Passage
9 Shaped element
10 Support roller
11a Concave pressure transmission surface
11b Convex pressure transmission surface
12 Friction-reducing surface coating
13 First caliper section
14 Second caliper section
15 Cavity
16 Bridge section
17 Plateau
A Partial length of shaped element from end of collar height
B Bore depth
C Length of shaped element
D Collar height

The invention claimed is:

1. A disk brake comprising a brake caliper and an application device arranged therein for applying force to the brake pads of the disk brake, wherein a component of the application device is a brake lever which can be actuated by a force element, which brake lever is composed of a lever arm against which the force element is supported and an application shaft which is supported, on one side, against a pressure piece operating in the direction of the brake pads, and, on the other side, with the interposition of a shell, against a channel arranged on the inside of the brake caliper, wherein the curvature of the shell is complementary to the curvature of the channel, characterized in that an opening of a bore is located in the channel, in that a passage produced by deformation of material of the shell is formed on the shell, facing the channel, which passage leads to a collar that extends into the bore to produce a positive fit between the shell and the channel, and in that a shaped element is arranged in the passage, the outer diameter of which shaped element is equal or nearly equal to the inner diameter of the passage,
wherein a blind bore serves as the bore,
wherein the length of the bore has a greater depth than the sum of the passage and of the shaped element protruding from the passage, wherein the bore has a depth equal to or greater than 1.2 times the axial extension of the shaped element.

2. The disk brake according to claim 1, characterized in that the shaped element is-a cylindrical pin.

3. The disk brake according to claim 2, characterized in that the cylindrical pin is made of unhardened and austenitic stainless steel.

4. The disk brake according to claim 1, characterized in that the application shaft is designed to receive at least one support roller between itself and the shell, wherein the support roller is rotatably or positively mounted on the application shaft on a partial circumference of the support roller and is rotatably mounted on the shell on a partial circumference of the support roller.

5. The disk brake according to claim 1, characterized in that the shell has a friction-reducing surface coating on its concave side.

6. The disk brake according to claim 1, characterized in that the shaped element, with its end face facing away from the bore, does not protrude beyond a formed plane of curvature of the concave pressure transmission surface.

7. A shell assembly for pressure transmission in an application device of a disk brake, comprising a shell on which, on one side, a concave pressure transmission surface for supporting a brake lever of the application device and, on the other side, a convex pressure transmission surface for support against an abutment designed as a channel is formed, characterized in that a passage in the form of a collar produced by deformation of material of the shell is formed on the shell on the side of the convex pressure transmission surface, and in that a shaped element, the outer diameter of which is equal to the inner diameter of the passage, is arranged in the passage,
wherein a blind bore serves as a bore,
wherein the length of the bore has a greater depth than the sum of the passage and of the shaped element protruding from the passage, wherein the bore has a depth equal to or greater than 1.2 times the axial extension of the shaped element.

8. The shell assembly according to claim 7, characterized in that the shaped element is a cylindrical pin.

9. The shell assembly according to claim 8, characterized in that the cylindrical pin consists of unhardened and austenitic stainless steel.

10. The shell assembly according to claim 7, characterized in that the shell has a friction-reducing surface coating on its concave pressure transmission surface.

11. The shell assembly according to claim 7, characterized in that the shaped element does not protrude beyond the plane of curvature of the concave pressure transmission surface with its end face facing away from the bore.

12. A disk brake comprising a brake caliper and an application device arranged therein for applying force to the brake pads of the disk brake, wherein a component of the application device is a brake lever which can be actuated by a force element, which brake lever is composed of a lever arm against which the force element is supported and an application shaft which is supported, on one side, against a pressure piece operating in the direction of the brake pads, and, on the other side, with the interposition of a shell, against a channel arranged on the inside of the brake caliper, wherein the curvature of the shell is complementary to the curvature of the channel, characterized in that an opening of a bore is located in the channel, in that a passage produced by deformation of material of the shell is formed on the shell, facing the channel, which passage leads to a collar that extends into the bore to produce a positive fit between the shell and the channel, and in that a shaped element is arranged in the passage, the outer diameter of which shaped element is equal or nearly equal to the inner diameter of the passage, wherein the shaped element, with its end face facing away from the bore, does not protrude beyond a formed plane of curvature of the concave pressure transmission surface.

13. A shell assembly for pressure transmission in an application device of a disk brake, comprising a shell on which, on one side, a concave pressure transmission surface for supporting a brake lever of the application device and, on the other side, a convex pressure transmission surface for support against an abutment designed as a channel is formed, characterized in that a passage in the form of a collar produced by deformation of material of the shell is formed on the shell on the side of the convex pressure transmission surface, and in that a shaped element, the outer diameter of which is equal to the inner diameter of the passage, is arranged in the passage, wherein the shaped element does not protrude beyond the plane of curvature of the concave pressure transmission surface with its end face facing away from the bore.

\* \* \* \* \*